No. 759,114. PATENTED MAY 3, 1904.
E. KRONKE.
PHOTOGRAPHIC CAMERA.
APPLICATION FILED SEPT. 12, 1902. RENEWED MAR. 31, 1904.
NO MODEL.
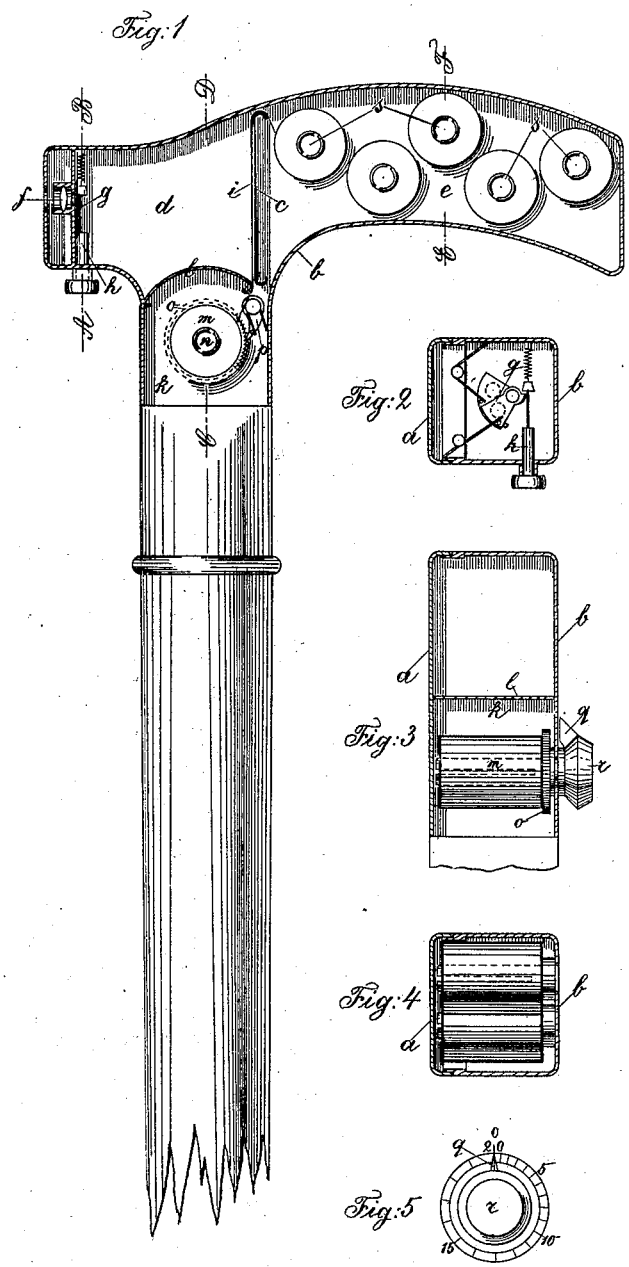

No. 759,114.

Patented May 3, 1904.

UNITED STATES PATENT OFFICE.

EMIL KRONKE, OF DRESDEN, GERMANY.

PHOTOGRAPHIC CAMERA.

SPECIFICATION forming part of Letters Patent No. 759,114, dated May 3, 1904.

Application filed September 12, 1902. Renewed March 31, 1904. Serial No. 200,953. (No model.)

*To all whom it may concern:*

Be it known that I, EMIL KRONKE, a subject of the King of Saxony, residing at 1 Linden Platz, Dresden, in the Kingdom of Saxony, Germany, have invented new and useful Improvements in Photographic Cameras, of which the following is a specification.

Photographic cameras inclosed within the handle of a walking-stick, and thereby rendered particularly suitable for use in traveling, were described in the British Patent No. 13,686 of 1891 and the German Patent No. 94,748. Inasmuch, however, as those cameras are capable of receiving but a small number of "picture-surfaces"—*i. e.*, plates or films—they necessarily permit only a correspondingly small number of photographic views to be taken unless an extra supply of spare films or plates be kept in reserve—say in one's coat-pocket or carried in a satchel or bag or otherwise—so that the "surfaces" in the stick may be replaced by new ones when used up. Apart from other drawbacks, however, this exchange is a complicated operation, which in certain places and circumstances it may be difficult or impracticable to carry out, more especially where the surfaces to be dealt with are of the class which cannot be exposed to daylight, as are those, for example, referred to in connection with the camera forming the subject of the said German Patent No. 94,748.

Now this invention relates to a camera constructed in the shape of a walking-stick handle, which differs from the two above-mentioned arrangements in this particular, that within the walking-stick handle room is provided not only for the camera itself and the roll of film intended for immediate operation, but in addition to this for a number of extra rolls, which are so arranged that their substitution for those exhausted by exposure can in each case be readily effected.

In the accompanying drawings, Figure 1 is a vertical longitudinal section of the combined walking-stick handle and photographic camera, showing its inner arrangement, while Figs. 2, 3, and 4 are sections of Fig. 1 along the lines A B, C D, and E F, respectively; and Fig. 5 is a detail view of an indicator for determining the extent to which the receiving-roll is to be turned after each exposure of the film.

The crook-shaped handle is made of thin material, and consists of two parts $a$ and $b$, the plane of division between which is vertical and parallel to the longitudinal axis of the handle; one part, $a$, which after the known manner of the lids of boxes, fits over a projecting rim of the other part, $b$, and is removable. The interior cavity of the handle is divided by a vertical plate $c$ into two compartments $d$ and $e$, the compartment $d$ forming the camera. The lens $f$ of the camera is inserted into the front of the handle, which is provided with a light-aperture. The shutter $g$, by which this aperture is controlled, is placed within the camera-compartment in the rear of the lens. The shutter may be constructed for either time or "snap-shot" exposures. As shown in Fig. 2 by way of example only, it may comprise a shutter consisting of two parts mounted on a hinge-pin common to both and adapted when an exposure is desired to swing under the action of a pin $h$, being drawn out axially by the operator.

The sensitized picture-surface intended to be used in this camera is by preference a film-roll arranged for being changed in daylight. The roller carrying the unexposed film $i$ is arranged behind the plate $c$, which plate at the same time serves the purpose of guiding the film and keeping it in the focal plane for exposure.

The roller or spool whereon the film-band winds after exposure is placed in the hollow space $k$ of the neck of the handle, which space for this purpose is made inaccessible to light from above by means of a screen $l$. The spindle $n$ carries the receiving-spool $m$ and is adapted to turn in the winding direction. A ratchet-wheel $o$, also mounted thereon, and a catch or pawl $p$, engaging therewith, prevent rotation in the wrong direction. The distance or extent to which the said spindle $n$ is to be turned to cause the exact length of film that has in each case been exposed to be wound on the spool $m$ is marked by an index $q$, mounted on the button or knob $r$, whereby the said spindle is turned, as illustrated in Fig. 3, a scale, as shown in Fig. 5, for the said index to move over being placed around the said knob $r$ on the outer wall of the said space or casing $k$. (See Fig. 5.)

The compartment $e$ of the crook-handle of the stick in addition to accommodating the roll of unexposed film which is being used from is at the same time utilized for storing an extra supply of film-rolls. The spools which carry the films are preferably made of thin metal. The bearers of these spools are hollow spindles or pins $s$, secured in the wall of the compartment $e$ and slotted longitudinally, so that the spools may readily be passed over them, after which, owing to the resilience of the hollow bearers, the spools are securely held in place thereon, such resilience or spring action at the same time operating as a check or brake upon the film as it is delivered to the camera for exposure.

As the film-rolls which it is proposed to employ in this camera are prepared for "changing in daylight," the exchange of a roll of film that has been exposed for a new one may be effected with the utmost rapidity when or wherever required. It is only necessary to remove the portion $a$, which forms the lid or cover, when all the spools in the handle will become accessible, so that the film-renewing operation simply consists in removing the spool carrying the roll of film already exposed, transferring the spool which is empty and one of the spools of unused film, respectively, from one spindle to another, and then attaching the end of the new film to the empty spool for receiving the film after exposure and shutting the lid, when all is once more ready for immediate use.

Assuming that the spools or rollers of the size indicated in the drawings are employed, these being calculated for twenty exposures each, and that five such film-rolls are inserted in the stick, as shown, it will be seen that one filling or charge of the portable camera will be sufficient for one hundred photographic pictures.

What I claim, and desire to secure by Letters Patent of the United States, is—

1. In a cane, having a hollow top, the combination of a photographic-camera attachment thereon, a compartment for supporting a plurality of film-rolls and a detachable side for the top of the cane.

2. In a cane, having a hollow portion at its upper end, compartments in the hollow portion of the cane, one of said compartments adapted to support a photographic camera and the other a plurality of film-rolls and a detachable side for the top of the cane.

3. In combination with a cane, hollow at its top, and having a photographic-camera attachment thereon, of means on one side of the top of the cane for supporting a plurality of film-rolls and a detachable side for the top of the cane.

4. A photographic camera formed within a walking-stick handle having three chambers $d$, $e$ and $k$ separated by screen-plates $e$ and $l$ the chamber $e$ being fitted with pins or bearers secured to one side of the cane-top for reserve rolls and a closure for the chambers comprising a detachable side for the cane-handle substantially as described.

5. The combination of a cane, having a hollow handle, of a camera attachment for the handle having three chambers, separated by screen-plates, one of said chambers being fitted with lens $f$ and shutters $g$, operated by a pin $h$, another of said chambers being fitted with a winding-spindle $m$, and ratchet-wheel $o$ and pawl $p$, and the other chamber being fitted with pins for holding reserve rolls of films, all of said chambers being inclosed by a detachable side for the cane-handle.

6. In a photographic camera in the shape of a walking-stick handle having chambers $d$, $e$ and $k$, screens $e$ and $l$, chamber $e$ being fitted with pins or spindles for carrying the spools of film, said spindles being split or slotted and a closure for the camera comprising a detachable side for the cane-handle all substantially as described.

7. The combination of a walking-stick with a photographic camera therein having split spindles carrying reserve spools of film said spindle being secured to one side of the cane-handle, and the opposite side of the cane-handle being detachable substantially as described.

8. In combination with a cane having a photographic-camera attachment in the handle thereof, of means on the cane for supporting a plurality of film-rolls, and means for preventing the admission of light to the remainder of the film-rolls when the film on one of the rolls is being exposed and a detachable side for the handle.

9. In combination with a cane having a photographic-camera attachment in the handle thereof, of means on the cane for supporting a plurality of film-rolls, and means whereby the rolls may be removed at pleasure comprising a detachable side for the handle.

10. In combination with a cane having a photographic-camera attachment in the handle thereof, of means secured to one side of the cane-handle for supporting a film-roll, said means also constituting a check or brake in the delivery of the film.

11. In combination with a cane having a photographic-camera attachment thereon, of means for supporting a film-roll comprising an expansible spindle secured at one end to one side of the cane-top.

12. In combination with a cane having a photographic-camera attachment thereon, of means for supporting a film-roll comprising a slotted spindle secured at one end to one side of the cane-top.

13. In combination with a cane having a photographic-camera attachment thereon and a hollow compartment, of means for supporting a film-roll in the hollow compartment, comprising a spindle secured at one end to one side of the cane-top and slotted at its free end, and a closure for the compartment adjacent the free ends of the spindles.

14. In combination with a cane hollow at its upper end and having two compartments, one for a photographic-camera attachment, and the other for a plurality of film-rolls, means secured to one side of the cane-handle for preventing the admission of light to the films not being exposed, and means whereby both compartments are readily accessible.

15. A cane having a hollow portion at its upper end and a series of compartments in the hollow portion thereof, a camera attachment for one of the compartments, a plurality of film-rolls for another and a film-receiving roll for the other, means for preventing the admission of light into any but the camera-compartment when the photograph is being taken and a closure for all of the compartments constituting one side of the top of the cane.

16. In combination with a cane hollow at its top having a camera attachment therein, of a film-receiving roll on the cane attached to one side of the top thereof, a light-proof screen dividing the camera attachment from the film-receiving roll and a detachable side for the top of the cane.

17. A cane having a hollow portion at its upper end and a series of compartments in the hollow portion thereof, a camera attachment for one of the compartments, a plurality of film-rolls for another, and a film-receiving roll for the other, a light-proof screen for dividing the compartments and a detachable side for the top of the cane forming a closure therefor.

18. In combination with a cane hollow at its handle and having a photographic-camera attachment therein, of a receiving-roll for the exposed film, means for rotating the receiving-roll, and means adjacent the handle of the cane for indicating the extent to which the roll is to be turned.

19. In combination with a cane hollow at its top and having a photographic-camera attachment therein, of a receiving-roll for the exposed film, means for rotating the receiving-roll, and an indicator on the outer surface of the cane adjacent the top thereof, to determine the extent to which the roll is to be turned.

20. In combination with a cane hollow at its top and having a photographic-camera attachment therein, of a receiving-roll for the exposed film, means for rotating the roll, an index on the outer surface of the cane and an indicator operatively associated with said roll and index for determining the extent to which the roll is to be turned, and a detachable side for the top of the cane, forming a closure for the camera and film-rolls.

In testimony whereof I affix my signature in presence of two witnesses.

EMIL KRONKE.

Witnesses:
 C. F. ROSENCRANTZ,
 PAUL E. SCHILLING.